United States Patent [19]

Brown et al.

[11] 4,335,382

[45] Jun. 15, 1982

[54] TRAFFIC RADAR SYSTEM

[75] Inventors: Bryce K. Brown, Decatur; Stephen Correll, Sadorus; Jay Schreiber, Villa Grove; Lawrence E. Mayfield, Decatur; Darrell D. Jenkins, Argenta, all of Ill.

[73] Assignee: Decatur Electronics, Inc., Decatur, Ill.

[21] Appl. No.: 128,510

[22] Filed: Mar. 10, 1980

[51] Int. Cl.[3] .......................... G01S 13/60; G01S 7/40
[52] U.S. Cl. ........................................ 343/8; 343/17.7
[58] Field of Search .................................. 343/8, 17.7

[56] References Cited
U.S. PATENT DOCUMENTS

| 3,936,824 | 2/1976 | Aker et al. | 343/8 |
| 4,214,243 | 7/1980 | Patterson | 343/8 |
| 4,236,140 | 11/1980 | Aker et al. | 343/8 |

Primary Examiner—T. H. Tubbesing
Attorney, Agent, or Firm—Neuman, Williams, Anderson & Olson

[57] ABSTRACT

A traffic radar system is provided in which the speed of a target vehicle is determined by measuring the difference in frequency between a component of a doppler signal which has a frequency proportional to the relative speed of the target vehicle and a moving patrol vehicle and a reference signal having a frequency proportional to the speed of the patrol vehicle. The reference signal is developed from a tachometer device which generates a periodic signal having a frequency proportional to the rotational speed of a vehicle wheel and phase-locked loop arrangements including adjustable dividers are provided for locking an oscillator to the tachometer signal and generating a reference signal at a frequency proportional to the actual speed of the patrol vehicle. For calibration, a component of the doppler signal produced from reflections from stationary objects is used.

12 Claims, 3 Drawing Figures

TRAFFIC RADAR SYSTEM

This invention relates to a radar system and more particularly to a radar system usable for traffic patrol and other applications with which the speed of a target vehicle or other moving target structure can be measured from a moving road patrol vehicle or other platform structure with a high degree of accuracy and reliability.

BACKGROUND OF THE INVENTION

Radar systems have heretofore been developed for measuring the speed of a target vehicle from a moving road patrol vehicle. In one type of system, two doppler signal components are developed, one being a reference signal component developed in response to reflections from the surface of a roadway or other stationary objects and the other being developed from reflections from a moving vehicle. By comparing the frequencies of the two doppler signal components, the speed of the moving target vehicle relative to the road surface can be determined. Such systems have been generally satisfactory in operation. However, there is a possibility that anomalies may be produced under certain conditions which, although unlikely to occur, have made it possible to challenge the absolute reliability or accuracy of indications obtained. For example, the reference signal component, which should be produced from reflections from the roadway to indicate the patrol car speed might be produced from other moving vehicles in the radar beam. There is also the possibility that false indications might be produced after double reflections from elements of a bridge or other structure.

In the prior art, little if any consideration has been given to possible alternatives which might avoid such objections and if consideration is given to possible alternatives, it will be found that they are such as to apparently operate in a manner such as to be even more objectionable. For example, if consideration is given to the development of a reference signal from the speed of rotation of the wheels of the patrol vehicle, it would appear that such a reference signal would be affected by the degree of inflation of the tires of the vehicle and might produce large inaccuracies.

SUMMARY OF THE INVENTION

This invention was evolved with the general object of overcoming the disadavantages of prior systems and of providing a system with which the speed of travel of a moving target structure may be accurately and reliably measured from a moving platform structure.

In accordance with this invention, a system is provided in which a signal developed by radar means from reflections from a moving target structure is compared with a reference signal corresponding to the speed of a platform structure in a manner such as to indicate the speed of the target structure relative to stationary objects. The reference signal is developed independently of the radar means and in a system designed for a road patrol vehicle, for example, the reference signal may correspond to the rotational speed of a wheel of the patrol vehicle and may be developed from a device connected to the speedometer shaft or associated therewith.

Such a reference signal might not accurately indicate the actual speed of the platform structure and, in accordance with the invention, calibration adjustment means are associated with the reference signal developing means to adjust the relationship between the reference signal and the speed of movement of the platform structure. In a system in which the reference signal is developed from a vehicle wheel, the relationship of the reference signal to the rotational speed of the patrol vehicle wheel is adjusted to obtain an accurate relationship between the reference signal and the actual speed of movement of the patrol vehicle relative to the roadway.

With this arrangement, an accurate and reliable measurement of the speed of a target structure can be obtained without using the radar apparatus to measure the platform structure speed during measurement of the target structure speed so as to obviate false indications.

However, in accordance with a specific feature of the invention, the signal produced by the radar means and from reflections from the roadway and other stationary objects is used for calibration purposes and removes any anomalies that may be contained in the reference signal. The radar produced signal and the reference signal are compared during calibration and calibration adjustment is obtained by adjusting the reference signal to obtain substantial equality with the radar produced signal. Calibration can be performed under carefully controlled conditions since the radar system can detect moving targets, and the possibility of any error from moving targets and other anomalies is substantially obviated.

In accordance with another specific feature, the indicator which is used under normal conditions for indicating the speed of a moving target vehicle can be used as an indicator of the radar produced signal during calibration. The other indicator which is used to indicate the speed of the patrol car remains the same under both normal and calibration conditions.

In accordance with a further specific feature of the invention, the reference signal is developed through the use of a phase-locked loop arrangement from a periodic signal which is devloped by a suitable transducer device and which has a frequency varying as a function of the speed of the platform structure. The transducer device may, for example, be coupled to a speedometer shaft of a patrol vehicle. The reference signal may, for example, be developed through a frequency divider circuit from a voltage-controlled oscillator of the phase-locked loop. To obtain a calibration adjustment, the division ratio of a divider of the phase-locked loop or the division ratio of the divider circuit used to develop the reference signal is adjusted. These features have important advantages in that an accurate calibration adjustment can be obtained while also generating a reference signal which can be compared with a periodic signal to permit comparison by digital circuitry and to provide a digital read-out.

Additional features of the invention relate to the provision of means for inhibiting the development of signals which might produce inaccurate results and for preventing the development of an output indication under conditions in which inaccurate results could be obtained.

This invention contemplates other objects, features and advantages which will become more fully apparent from the following detailed description taken in conjunction with the accompanying drawings.

DESCRIPTION OF A PREFERRED EMBODIMENT

Figure 1:
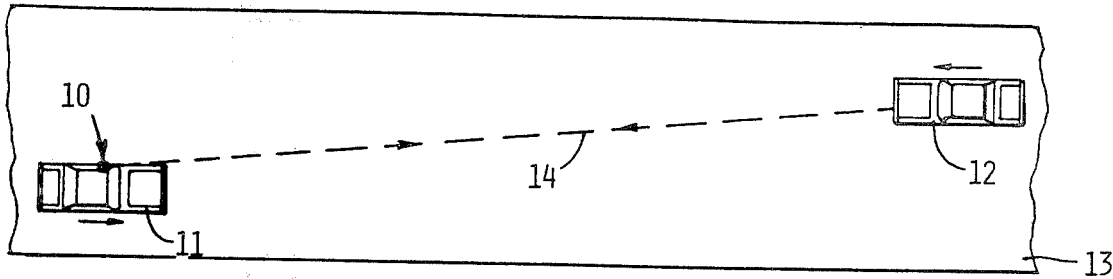
FIG. 1 is a schematic view illustrating patrol and target vehicles on a roadway with a radar instrument of the invention on the patrol vehicle.

Reference numeral 10 generally designates a radar instrument constructed in accordance with the principles of the invention. The instrument 10 as illustrated herein is designed for use by police for the patrol of traffic but it will be understood that it can be used in any application in which it is desired to measure the speed of a target structure from a platform structure while both structures are in motion relative to stationary objects. It is also noted that in the preferred embodiment as illustrated herein, the invention is advantageously applied to a radar instrument having one particular type of circuitry and it will be understood that basic concepts of the invention can be applied to instruments having various other types of circuitry. Specific examples as to circuit components and arrangements and as to speeds, frequencies, division ratios and other numerical values are provided as illustrative examples and are not to be construed as limitations.

As diagrammatically shown in FIG. 1, the instrument 10 may be mounted on a patrol vehicle 11 and includes radar means for transmitting a signal toward a target vehicle 12 when the patrol vehicle and target vehicles are moving in opposite directions on a roadway 13. Thus, the high frequency energy may be transmitted toward the target vehicle 12 along a path as indicated by reference numeral 14 to be reflected back along the same path. By measuring changes in the transmitted frequency, the relative speed of the two vehicles can be measured. Changes in the transmitted frequency may be conveniently measured by measuring only the difference between the frequency transmitted and the frequency received.

Figure 2:
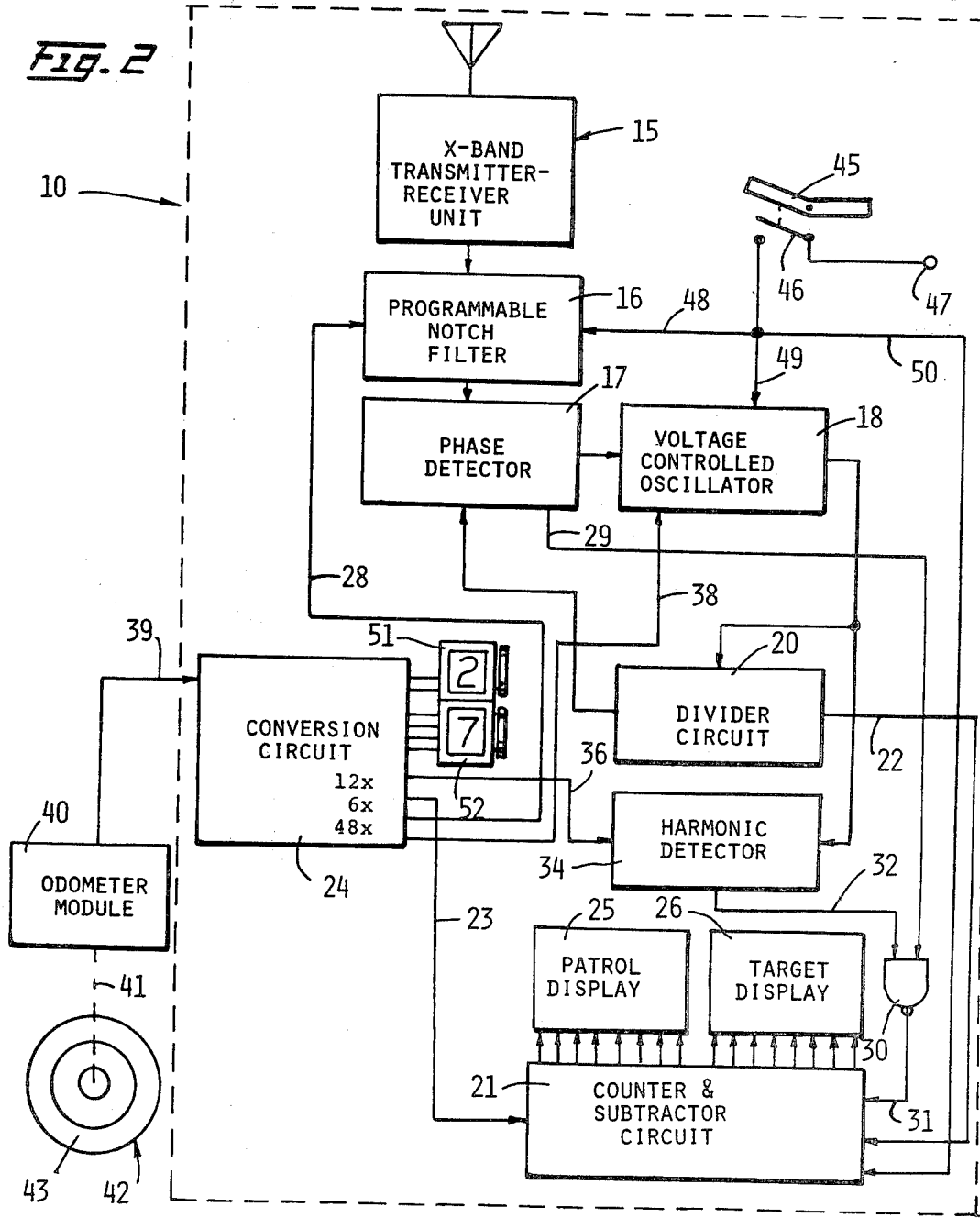
FIG. 2 is a schematic block diagram of circuitry of the radar instrument of the invention.

Referring to FIG. 2, reference numeral 15 generally indicates a microwave antenna and transceiver unit for developing a doppler effect output signal having a frequency proportional to speed. The doppler signal so developed is applied through a tunable high pass filter 16 to a target phase detector 17 which controls a target voltage controlled oscillator 18. A second input of the target phase detector 17 is connected to the output of a divider circuit 20 having an input connected to the target voltage controlled oscillator 18. The target phase detector 17 compares the signals applied thereto and so controls the oscillator 18 as to maintain the frequency of the oscillator at a certain multiple of the applied input doppler signal according to the division ratio of the divider 20. By way of example, the division ratio may be 48 and the oscillator 18 may operate at a frequency of 48 times the incoming doppler signal.

The frequency of operation of the oscillator 18 is proportional to the algebraic sum of speeds of the patrol and target vehicles 11 and 12 and it is necessary to make a comparison with a signal proportional to the speed of the patrol vehicle in order to establish the absolute speed of the target vehicle relative to the roadway. For this purpose and to develop signals for display of both of the speeds, a counter circuit 21 is provided which includes subtracter circuitry. A signal is applied through a line 22 from the divider circuit 20 to the counter circuit 21. In addition, a signal is applied through a line 23 from a conversion circuit 24, the signal on line 23 being a function of the speed of movement of the patrol vehicle 11. Outputs of the counter circuit 21 are applied to patrol and target display units 25 and 26 for digital display of the respective speeds of the two vehicles.

The construction of the counter circuit 21 is such that the frequency of the applied signals may be equal to six times the frequency of the corresponding doppler signal which may be 31.389 Hz/MPH by way of example and not by way of limitation. Thus, the frequency on the line 22 may be 188.334 Hz/MPH and with a division ratio of 48 between the frequency of the oscillator 18 and the doppler frequency, the line 22 may be taken from a tap on the divider circuit 20 at which a division ratio of 8 is obtained.

The signal on line 23 would then be at a frequency of six times the frequency of a signal generated at the rate of 31.389 Hz per MPH of the patrol vehicle and may be designated as a "6X" signal. The conversion circuit 24 additionally develops a "48X" output signal at a frequency equal to eight times the frequency of the signal on line 23, the signal being applied through a line 28 to the programmable notch filter 16. In response to the signal so applied, the tunable high pass filter 16 filters out signals at frequencies within a narrow band centered on the frequency of 31.389 Hz/MPH of the patrol vehicle. The result is that during normal operation, the system is non-responsive to signals derived from reflections from stationary objects.

The conversion circuit 24 also develops signals for limiting the range of a sweep operation of the voltage-controlled oscillator and for preventing the development of indications from multiple reflections.

The voltage controlled oscillator 18 may preferably be so designed as to automatically sweep or change its frequency through a certain frequency range when no target vehicle is within range and to automatically lock in and cause an indication to be produced when a reflection from a target vehicle is received, under control of the phase detector circuit 17. When the locking function is performed, a lock signal may be developed at an output line 29 of the phase detector, which may be applied through a gate 30 and a line 31 to a target lock input of the counter circuit 21. The gate circuit 30 is controlled through a line 32 from an output of a harmonic detector circuit 34 which has one input connected to the output of the oscillator 18 and a second input connected through a line 36 to an output of the conversion circuit 24.

The purpose of the gate circuit 30 and the harmonic detector circuit 34 is to prevent obtaining of improper readings in response to multiple bounce or multiple reflections which might be produced, for example, when the patrol vehicle is approaching a bridge or other strongly reflecting structure. When, for example, the patrol vehicle is moving at 50 MPH and is approaching a bridge, there is a possibility of a signal being developed from a double reflection which corresponds to a closing speed of 100 MPH. If there is a substantial angle between the direction of movement of a patrol vehicle and the line to the reflecting surface, there is a a cosine error which might extend the frequency range of the received double reflected signal to say, from 98 to 102 MPH. The harmonic detector 34 is arranged to detect such signals.

For proper operation, the signal applied through the line 36 to the detector 34 should be at a sub-multiple of the oscillator output frequency and may preferably be a "12X" signal at a frequency equal to ⅓ the oscillator frequency, assuming that the oscillator frequency is 48 times the doppler frequency.

It is also desirable to limit the frequency range through which the oscillator 18 sweeps when no reflection from a target is being received. In the system as illustrated, a signal is applied from the conversion circuit 24 and through a line 38 to the oscillator circuit 18, to limit the low end of the search range to a frequency slightly above the frequency which corresponds to the speed of movement of the patrol vehicle. For example, with the patrol vehicle traveling at 50 MPH, the signal on line 38 may prevent the voltage controlled oscillator 18 from sweeping below a frequency which corresponds to about 51 MPH.

The conversion circuit 24 thus operates to supply a "6X" output signal on line 23 for applying the patrol speed signal to the counter circuit 21, a "48X" output on line 28 for control of the high pass filter 16, a "12X" output signal on line 36 for application to the harmonic detector 34 and a DC voltage on line 38 to limit the lower end of the sweep range of the voltage control oscillator 18.

The conversion circuit 24 develops such signals from an input signal applied through a line 39 from the output of an odometer module 40 which, as diagrammatically indicated by line 41, may be coupled to a wheel 42 having a tire 43. The odometer module 40 may, for example, be coupled to the conventional shaft on the transmission of the vehicle, or any part of the vehicle that has movement proportioned to the rotational speed of the drive wheels of the vehicle. The coupling may be a mechanical, magnetic or electronic device. The coupling may be the receipt of an electronic signal from an electronic odometer.

The output signal of the odometer module may preferably be in the form of a wave or other periodic signal having a frequency proportional to the rotational speed of the wheel 42. For example, the odometer module may generate a square wave having 6,000 pulses per mile so as to produce an output frequency of 1.6667 Hz/MPH, assuming a certain effective wheel diameter such as produced with average, normal inflation of the tires and assuming that other conditions are normal. The relationship between the frequency of the signal on line 39 and the actual speed of movement of the patrol vehicle may change very substantially with changes in the inflation of the tires, temperature, etc., and an important feature of the invention relates to the provision of means for making calibration adjustments of the conversion circuit 24.

Calibration can be performed either automatically or manually and in either case should be performed when there are no vehicles in range of the radar. In automatic calibration which may be performed at timed intervals, the absence of vehicles in range of the radar may be signaled to the conversion circuit through line 29 and the conversion circuit may then deactivate the filter 16 through the line 28 and remove the sweep limit signal applied through line 38 so as to allow the voltage controlled oscillator 18 to lock in on the return signal from the roadway. The conversion circuit 24 may then adjust the 6X signal on line 23 until the signal on line 23 is effectively equal to that on line 22.

For manual calibration, a switch control 45 is moved from a normal position as illustrated to a calibrate position in which a switch 46 is closed. A signal is then applied from a terminal 47 to lines 48, 49 and 50 to deactivate the filter 16, remove the sweep limit of the oscillator 18 and deactivate a subtractor portion of the circuit 21. The conversion circuit 24 may then be adjusted through a pair of thumb wheel switches 51 and 52 until the two displayed speeds match. It will be understood that potentiometers, switches or other devices may be used for calibration in place of the thumb wheel switches 51 and 52.

Once the system is calibrated, it will track while operating over a wide range of speeds, as from 100 MPH down to 1 MPH. For the automatic calibration operation, a signal may be developed periodically within the conversion circuit 24 or from an external source to cause the calibration to be performed at timed intervals.

Figure 3:
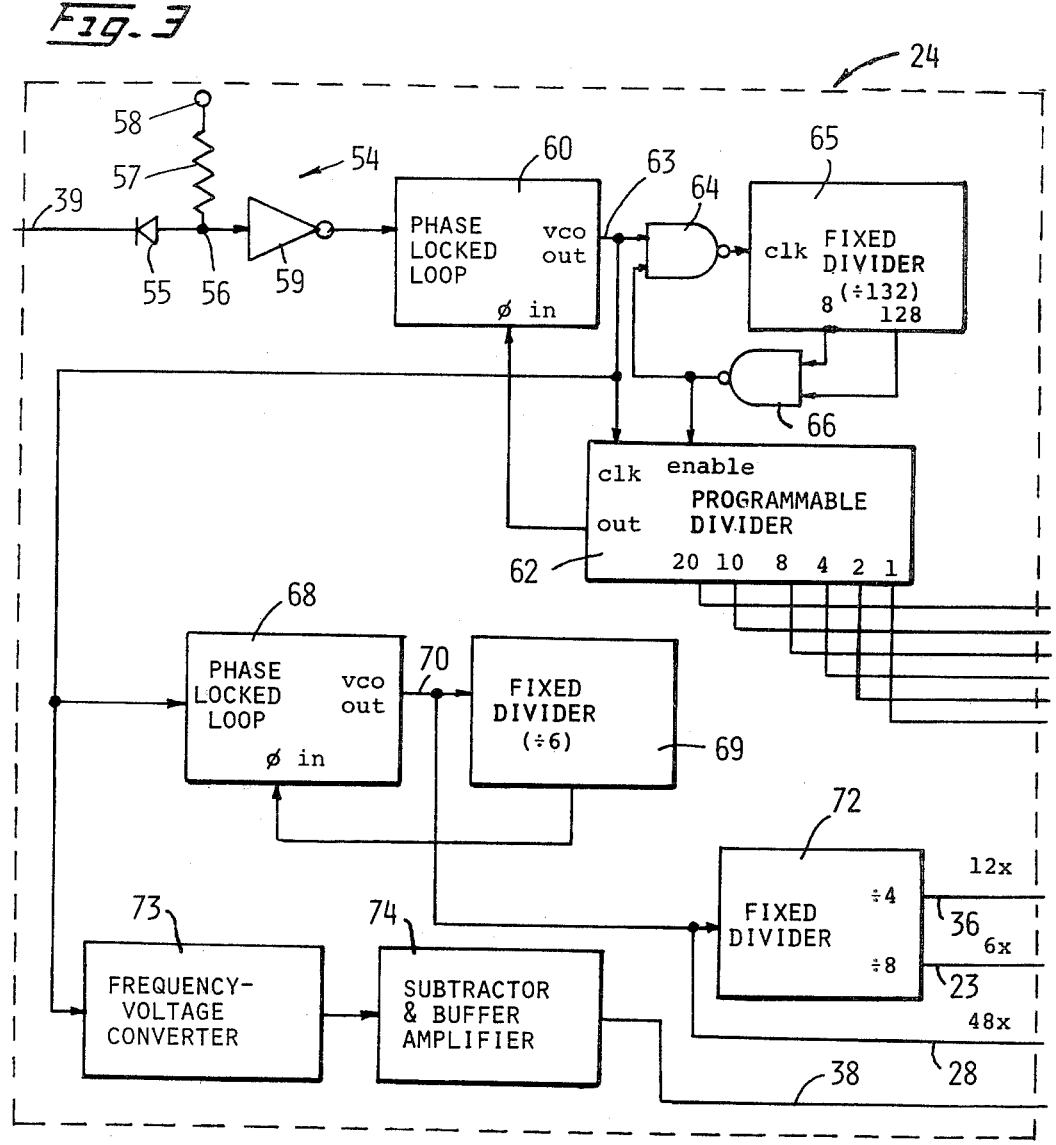
FIG. 3 is a schematic diagram showing details of a conversion circuit included in the circuitry of FIG. 2.

FIG. 3 is a circuit diagram of a form of the conversion circuit 24 designed for the manual calibration operation as above described. It will be understood that the circuitry is shown in detail to provide an illustrative example and other types of circuitry may be used. In the circuit of FIG. 3, the signal from the odometer module 40 is applied through the line 39 to a Schmitt trigger circuit 54 including a diode 55 between line 39 and a circuit point 56 which is connected through a resistor 57 to a power supply terminal 58 and also to the input of an inverter 59. The Schmitt trigger circuit converts the input signal to the proper level for the circuitry which may preferably be of a Cmos type. The Schmitt trigger circuit 54 also eliminates input noise.

The output of the Schmitt trigger circuit 54, at the output of the inverter 59, is applied to one input of a phase-locked loop circuit 60 which has a second input connected to the output of a programmable divider circuit 62. A clock input of the programmable divider circuit 62 is connected to a voltage controlled oscillator output line 63 from the loop circuit 60. The line 63 is connected to one input of a gate circuit 64 which has an output connected to a clock input of a fixed divider circuit 65. Outputs of the fixed divider circuit 65 are connected to inputs of a gate 66 which has an output connected to a second input of the gate 64 and also to an enable input of the programmable divider 62.

The divider 65 together with the gates 64 and 66 operates to count to 132, then disables itself while enabling the programmable divider 62. When the count in the divider 62 equals a programmed count of from zero to 39, both counters 62 and 65 are reset and the process is restarted. The programmable divider 62 is controlled from the thumb wheel switches 51 and 52 and a BCD code may be used. The switch 51 controls the "tens" digit through a "10" line and a "20" line. The switch 52 controls the units digit through "1", "2", "4" and "8" lines. Thus, the division ratio of the phase-locked loop may be adjusted from 132 to 171.

The output of the phase-locked loop circuit 60 at line 63 is applied to one input of another phase-locked loop circuit 68 which has a second input connected to the output of a fixed divider circuit 69 having an input connected through a line 70 to a voltage controlled oscillator output terminal of the phase-locked loop 68. The divider 69 has a division ratio of 6 and thus the output signal at line 70 has a frequency equal to 6 times the frequency of the signal at line 63. Accordingly, the signal at line 70 has a frequency equal to from 792 to 1026 times the input frequency on line 39, depending upon the adjustment of the thumb wheel switches.

If it is assumed that the input frequency at line 39 is 1.6667 Hz/MPH under typical or average conditions with respect to tire inflation, etc., the desired multiplier factor is 904 to obtain a frequency equal to 48 times the corresponding doppler frequency and with the arrangement as described and shown, the desired multiplier of 904 is obtained at about a mid-range switch setting.

The following is a chart of the resultant frequency multipliers produced by the fixed multipliers and the programmable adjustment. (Mult=(132+thumbwheel setting) X 6.

| Sw. | Mult. | Sw. | Mult. | Sw. | Mult. | Sw. | Mult. |
|---|---|---|---|---|---|---|---|
| 0 | 792 | 10 | 852 | 20 | 912 | 30 | 972 |
| 1 | 798 | 11 | 858 | 21 | 918 | 31 | 978 |
| 2 | 804 | 12 | 864 | 22 | 924 | 32 | 984 |
| 3 | 810 | 13 | 870 | 23 | 930 | 33 | 990 |
| 4 | 816 | 14 | 876 | 24 | 936 | 34 | 996 |
| 5 | 822 | 15 | 882 | 25 | 942 | 35 | 1002 |
| 6 | 828 | 16 | 888 | 26 | 948 | 36 | 1008 |
| 7 | 834 | 17 | 894 | 27 | 954 | 37 | 1014 |
| 8 | 840 | 18 | 900 | 28 | 960 | 38 | 1020 |
| 9 | 846 | 19 | 906 | 29 | 966 | 39 | 1026 |

As specified earlier, the desired multiplier is 904 if the odometer reading is exactly 1.6666 Hz/MPH. This yields an adjustment range of +13.49% to −12.38%, in 0.648% increments. Total error, due to step size, is then 0.324%.

The accuracy thus obtained is more than adequate for most applications. However, if greater accuracy is desired, it may be readily obtained by increasing the frequency of operation of the voltage controlled oscillators of the phase-locked loops while also increasing the number of divider stages.

The output of the phase-locked loop 68 at line 70 is applied directly through the line 28 to the programmable notch filter 16 and is also applied to the input of a fixed divider circuit 72 which has a divide-by-4 output connected to the 12X output line and a divide-by-8 output connected to the 6X output line 23.

To develop the DC signal on line 38, for limiting the frequency range of sweeping of the voltage controlled oscillator 18, a frequency-to-voltage converter 73 is provided having an input connected to the output line 63 from the phase-locked loop 60 and having an output connected to a subtracter and buffer amplifier 74, the output of amplifier 74 being connected to the line 38. The circuits 73 and 74 operate to develop a DC voltage of the proper magnitude for limiting the lower end of the sweep frequency range. By way of example, it may provide a DC voltage on line 38 of from +5 volts to +2.5 volts in 0.025 volt increments. Thus, at 1 MPH, the voltage may be 4.975 volts and at 100 MPH, the voltage may be 2.5 volts.

The conversion circuit thus operates to generate the required signals for application to the counter circuit 21, the tunable filter 16, the voltage control oscillator 18 and the harmonic phase detector 34 with a high degree of accuracy. The use of the phase-locked loops in the conversion circuit is an advantageous feature. It permits accurate calibration adjustment through the use of the programmable divider 62, controlled by the thumbwheel switches 51 and 52. Also, the relationship between the frequency of the output of the odometer module 40 and the speed of rotation of the patrol vehicle wheels is not critical and different relationships can be readily accommodated by adjustment or selection of the ratios used in the dividers of the conversion circuit.

The radar instrument 10 together with the odometer module 40 thus provides a system which includes platform structure speed measuring means operable independently of energy transmitting and receiving means for developing a signal corresponding to the speed of the platform structure relative to stationary objects, such platform structure speed measuring means being formed in the illustrated system by the odometer module 40 operating in conjunction with the conversion circuit 24, the signal produced by such platform structure speed measuring means being produced on the line 23. The signal so produced is compared by the counter and subtractor circuit 21, in the illustrated system, with a signal produced on line 22 by the energy transmitting means and associated components, including the unit 15, filter 16, phase detector 17 and voltage controlled oscillator 18. The conversion circuit 24 in the illustrated system further includes the programmable divider 62 and associated components which form calibration adjustment means operable for insuring an accurate relation between the signal on line 23 and the actual speed of movement of the platform structure speed measuring means.

An auxiliary platform structure speed measuring means is provided in the illustrated system by the components operated when the switch 46 is closed. A signal is then applied to deactivate the filter 46, remove the sweep limit of the oscillator 18 and deactivate a subtractor portion of the circuit 21, the conversion circuit 24 being then adjustable through the thumbwheel switches 51 and 52 to obtain a match between the two displayed speeds. The speed of the platform structure as measured from the odometer module 40 and associated circuitry is then again indicated on the patrol display 25 while the speed of the platform structure as measured from the auxiliary platform structure speed measuring means, then formed by the transmitter-receiver unit 15 and associated circuitry, is indicated on the target display 26. Thus, the target display 26 in the illustrated system forms an indicating means which is operable in a calibration mode of operation to indicate the speed of the platform structure and which is operable in a normal mode of operation to indicate the speed of a target structure.

It is noted that the target structure speed measuring means and the auxiliary platform structure speed measuring means include common circuitry. The phase detector 17, voltage controlled oscillator 18 and divider circuit 20 are selectively used in such means in the illustrated system, the notch filter 16 being disabled when such common circuitry is used as auxiliary platform structure speed measuring means.

The platform structure speed measuring means in the illustrated system comprises a phase-locked loop 60 which includes a voltage-controlled oscillator and a phase detector, the phase-locked loop having two inputs. One of such inputs in the illustrated system is connected to the output of frequency divider means formed by the programmable divider 62 and the fixed divider 65 in the illustrated system, the other of the inputs being connected through the inverter 59 and diode 55 to the output of the odometer module 40 which forms transducer means developing an output signal in response to movement of the platform structure. Frequency divider means including the phase-locked loop 68, fixed divider 69 and fixed divider 72 are provided for developing from the output of the oscillator of the phase-locked loop 60 a signal proportional to the speed of movement of the platform structure. It is noted that the calibration adjustment means is associated with one of the frequency divider means, such being the programmable divider 62 in the illustrated system.

The circuitry of FIG. 3 is designed for manual calibration. For automatic calibration, circuitry may be added to adjust and obtain substantial equality between signals such as those developed on lines 22 and 23 in response to the signal on line 29 and an internally or externally generated timing signal.

The circuit is particularly designed for the illustrated radar system in which a phase-locked loop is used for generating the signal for application to the counter circuit 21 to operate the target display 26 after digital subtraction of the patrol vehicle speed signal. However, the conversion circuit 24 could be readily adapted for use in radar systems having other types of circuitry.

It will be understood that one particular type of system is disclosed herein to facilitate an understanding of the concepts of the invention and to provide an example of a preferred embodiment and other types of systems might be used in accordance with the invention. For example, the use of phase-locked loops is advantageous in many respects but other forms of circuitry might be used to receive doppler effect signals and convert them to displayed readings. The use of a tachometer type of odometer module is also advantageous but the odometer module may have other forms and might develop current, voltage, electronic data or frequencies as the output. The calibration procedure may be performed automatically as well as manually, as above noted.

It will be understood that other modifications and variations may be effected without departing from the spirit and scope of the novel concepts of this invention.

What is claimed is:

1. Apparatus for installation on a movable platform structure and for determining the speed of a target structure while both structures are in motion, comprising: energy transmitting and receiving means for transmitting energy toward and receiving energy from reflecting surfaces for developing a first signal having components indicating the relative speed of said platform structure and said reflecting surfaces, platform structure speed measuring means operable independently of said energy transmitting and receiving means for developing a second signal corresponding to the speed of said platform structure relative to stationary objects, second speed measuring means including means for comparing said second signal and components of said first signal which are produced from reflections from a moving target structure for measuring the speed of the target relative to stationary objects, and calibration adjustment means associated with said platform structure speed measuring means for adjustment thereof to insure an accurate relationship between said second signal and the actual speed of movement of said platform structure relative to stationary objects.

2. In apparatus as defined in claim 1, said second speed measuring means including means for operation for calibration purposes independently of the first-mentioned platform structure speed measuring means and operable for measuring the actual speed of the platform structure relative to stationary objects to facilitate adjustment of said calibration adjustment means.

3. In apparatus as defined in claim 2, indicating means for producing an indication of the speed of said platform structure as measured from the first-mentioned platform structure speed measuring means and for producing an indication of the speed of said platform structure as measured by said second speed measuring means during operation for calibration purposes, said calibration adjustment means being adjustable to obtain substantial equality between said indications.

4. In apparatus as defined in claim 3, means for selectively operating said indicating means in a calibration mode of operation to produce said indication of the speed of the platform structure as measured by said second speed measuring means during operation for calibration purposes and in a normal mode of operation to produce an indication of the speed of the target structure.

5. In apparatus as defined in claim 2, said second speed measuring means including means operative in response to components of said first signal which are produced from reflections from stationary reflecting surfaces, filter means controlled from said second signal and operable between said radar means and said second speed measuring means to attenuate components of said first signal produced by reflections from stationary surfaces, and means for disabling said filter means during operation of said second speed measuring means for calibration purposes.

6. In apparatus as defined in claim 1, said platform structure speed measuring means being operable to develop said second signal as a periodic signal having a characteristic varying as a function of the speed of said platform structure and comprising transducer means for developing a periodic output signal in response to rotation of an element; and said calibration adjustment means comprising means for adjusting the ratio between the number of rotations of said element per unit time and the frequency of said periodic second signal.

7. In apparatus as defined in claim 6, said platform structure speed measuring means comprising frequency divider means, and said calibration adjustment means comprising means for adjusting a division ratio of said frequency divider means.

8. In apparatus as defined in claim 1, said platform structure speed measuring means comprising a phase-locked loop including a voltage-controlled oscillator output and having two inputs, and frequency divider means having an input connected to said oscillator output and an output connected to one of said inputs, transducer means for developing an output signal in response to movement of said platform structure, means for applying said transducer means output signal to the other of said phase detector inputs, and frequency divider means for developing said second signal from said output of said oscillator.

9. In apparatus as defined in claim 8, said calibration adjustment means comprising means for adjusting the division ratio of at least one of said frequency divider means.

10. In apparatus as defined in claim 1, said second speed measuring means comprising a phase-locked loop including a voltage-controlled oscillator, a phase detector controlling said oscillator and having two inputs and frequency divider means having an input connected to said oscillator and an output connected to one of said phase detector inputs, and coupling means for applying to the other of said phase detector inputs components of said first signal which are produced from reflections from a moving target structure.

11. In apparatus as defined in claim 10, said coupling means comprising filter means controlled from said periodic second signal and operative to attenuate components of said first signal produced by reflections from stationary surfaces.

12. In apparatus as defined in claim 1, wherein said second signal is developed as a periodic signal having a characteristic varying as a function of the speed of said platform structure, said second speed measuring means comprising indicating means for indicating the speed of a moving target structure, and means for disabling said indicating means when said first signal contains components at frequencies equal to predetermined multiples of the frequency of said periodic second signal.

* * * * *

UNITED STATES PATENT AND TRADEMARK OFFICE
CERTIFICATE OF CORRECTION

PATENT NO. : 4,335,382

DATED : June 15, 1982

INVENTOR(S) : Bryce K. Brown, R. Stephen Correll, Jay Schreiber, Lawrence E. Mayfield and Darrell D. Jenkins It is certified that error appears in the above-identified patent and that said Letters Patent are hereby corrected as shown below:

On the title page,

In the heading, under "Inventors:", "Stephen Correll" should be changed to -- R. Stephen Correll --.

Column 4, line 21 "than" should be changed to -- then --.

Signed and Sealed this

Second Day of November 1982

[SEAL]

Attest:

GERALD J. MOSSINGHOFF

Attesting Officer    Commissioner of Patents and Trademarks